United States Patent [19]

Muller

[11] Patent Number: 4,911,592
[45] Date of Patent: Mar. 27, 1990

[54] METHOD OF INSTALLATION AND INSTALLATION APPARATUS

[75] Inventor: Rudolph R. M. Muller, Frankfurt, Fed. Rep. of Germany

[73] Assignee: Multifastener Corporation, Detroit, Mich.

[21] Appl. No.: 270,917

[22] Filed: Nov. 14, 1988

Related U.S. Application Data

[60] Division of Ser. No. 69,804, Aug. 17, 1987, Pat. No. 4,810,143, which is a continuation-in-part of Ser. No. 563,833, Dec. 21, 1983, Pat. No. 4,555,838, which is a continuation-in-part of Ser. No. 485,099, Mar. 28, 1983, Pat. No. 4,459,073, and a continuation-in-part of Ser. No. 504,074, Jun. 14, 1983, Pat. No. 4,543,701, said Ser. No. 485,099, Division of Ser. No. 229,274, said Ser. No. 504,074, is a continuation of Ser. No. 229,274.

[51] Int. Cl.⁴ .............................................. F16B 37/04
[52] U.S. Cl. ................................. 411/181; 411/183; 29/432.2; 29/512
[58] Field of Search .............. 411/179, 180, 181, 183, 411/173, 427; 29/512, 432, 432.1, 432.2

[56] References Cited

U.S. PATENT DOCUMENTS

| | | | |
|---|---|---|---|
| 2,053,490 | 9/1936 | Novick | 29/432.2 |
| 3,095,777 | 7/1963 | Hallock | 29/432 |
| 3,393,724 | 7/1968 | Joffe | 29/432 |
| 3,432,925 | 3/1969 | Wolley | 29/512 |
| 3,579,802 | 5/1971 | Gajouski | 29/432.2 |
| 3,602,974 | 9/1971 | Koett | 29/432.1 |
| 3,754,731 | 8/1973 | Mackal et al. | 29/512 |
| 3,800,401 | 4/1974 | Jesevich et al. | 29/512 |
| 3,871,264 | 3/1975 | Hallock | 411/968 |
| 3,938,239 | 2/1976 | Lauth | 29/512 |
| 4,004,483 | 1/1977 | Hallock | 411/968 |
| 4,018,257 | 4/1977 | Jack | 29/512 |
| 4,039,099 | 8/1977 | Boxall | 29/243.52 |
| 4,064,617 | 12/1977 | Oaks | 29/432.1 |
| 4,193,333 | 3/1980 | Hallock | 29/432.1 |
| 4,281,446 | 8/1981 | Umeno | 29/432.1 |
| 4,490,904 | 1/1985 | Moyher | 29/432.24 |
| 4,630,362 | 12/1986 | Bauer et al. | 29/432.1 |

FOREIGN PATENT DOCUMENTS

| | | | |
|---|---|---|---|
| 1468150 | 3/1977 | United Kingdom | 29/432 |
| 1471666 | 4/1977 | United Kingdom | 29/432 |

Primary Examiner—Neill R. Wilson
Attorney, Agent, or Firm—Dykema Gossett

[57] ABSTRACT

An installation apparatus and method of attaching a female element, such as a nut, to a panel, wherein the panel is pierced and the female element is permanently installed in the pierced panel opening in a continuous operation. The female element includes a body portion and an annular barrel portion. In one of the methods disclosed, the panel is pierced by the free end of the barrel portion and the panel slug is disposed in the barrel portion as the nut is installed in the panel. In the presently preferred method, the panel is pierced by a punch received through the body and barrel portions, prior to driving the female element into a mechanical interlock with the panel. In the preferred installation, the free end of the barrel portion is deformed into a hook-shaped end portion, opening toward the body portion, and the panel is simultaneously driven into the hook-shaped barrel end portion, forming a very secure mechanical interlock. The preferred installation apparatus includes an annular plunger which drives the female element into the panel and which is reciprocally supported in a chamber in a base member attached to one die member of a press. A punch is located within the annular plunger which pierces the panel prior to driving the female element into the panel, as described.

6 Claims, 8 Drawing Sheets

METHOD OF INSTALLATION AND INSTALLATION APPARATUS

This application is a divisional application of my U.S. application Ser. No. 069,804, filed August 17, 1987, now U.S. Pat. Ser. No. 4,810,143, which is a continuation-in-part of Ser. No. 563,833, Dec. 21, 1983, Pat. No. 4,555,838, which is a continuation-in-part of Ser. No. 485,099, Mar. 28, 1983, Pat. No. 4,459,073, and Ser. No. 504,074, Jun. 14, 1983, Pat. No. 4,543,701, said Ser. No. 485,099, is a division of Ser. No. 229,274, Jan. 28, 1981, abandoned, said Ser. No. 504,074, is a continuation of Ser. No. 229,274, Jan. 28, 1981, abandoned.

FIELD OF THE INVENTION

The present invention relates to methods of attaching a female element, particularly female fastener elements such as a nut, to a panel, wherein the panel is pierced and the female element is installed in the pierced panel opening in a continuous operation and an installation apparatus.

The prior art includes self-piercing nuts, which may also be simultaneously clinched to secure the nut in the pierced panel opening, such as disclosed in U.S. Pat. Nos. 3,299,500 and 3,314,138, assigned to the assignee of the instant application. The prior art also includes a number of self-riveting nuts, including nuts having an annular skirt or barrel portion wherein the free end of the barrel portion is deformed radially outwardly in a die member to form a mechanical interlock with the panel, see for example U.S. Pat. Nos. 3,938,239 and 4,018,257. The self-riveting nuts disclosed in such patents are, however, secured to a panel having a prepierced panel opening, requiring two separate operations. Such methods also require very precise centering of the nut relative to the prepierced panel opening, limiting the integrity of the installation, particularly in production applications. U.S. Pat. No. 3,926,236, which is assigned to the assignee of the instant application, discloses a method of attaching a nut wherein the panel is pierced by a punch which extends through the nut bore to pierce and secure the nut in a continuous operation, however, the fastener is not a riveting type fastener having a barrel portion extending through the pierced panel opening. Reference is also made to U.S. Pat. No. 3,800,401 which discloses a method of making a container closure such as a tag ring, in a continuous application. It is understood that the prior art also includes various riveting techniques and methods wherein the fastener element includes an annular end portion, which may be press fitted through an opening in a panel, which is then riveted or deformed radially outwardly in a die member having an annular semi-torodial die cavity, which may include a projecting central die portion which receives the annular riveting end of the fastener. The prior art also discloses means of attaching stud-like fasteners, wherein the stud includes an annular end portion which penetrates a plate or structural member, which may be deformed radially outwardly. Examples of such prior art are cited in the above identified copending application.

The method of attaching a female element or fastener of the present invention forms a unique and improved assembly, particularly in relatively thin panels such as presently used in the automotive and appliance industries. The methods of this invention are performed in a continuous operation and are particularly suitable for application in a die apparatus or press having relatively moveable press members, wherein the installation apparatus is attached to the die members within the press. The die press may be utilized to simultaneously form the panel into any desired configuration, making the method and installation apparatus of this invention particularly suitable for mass production applications. Several female elements or fasteners may be installed with each stroke of the die press, eliminating the requirement for secondary operations including prepiercing the panel.

SUMMARY OF THE INVENTION

As described, the method of this invention may be utilized to permanently install a female element or fastener in a panel in a continuous operation. The female element utilized in the method of this invention includes a body portion, an annular barrel or skirt portion which extends from the body portion having a free open end, and a bore which extends through the body portion, preferably in coaxial alignment with the opening through the barrel portion. The female element may be a nut having a threaded or unthreaded bore, a bearing or similar element.

The method of this invention includes first locating the female element adjacent a panel with the barrel portion free end facing the panel ready for installation; then, piercing a slug from the panel, forming a pierced panel opening coaxially aligned with the body portion bore and barrel portion opening. The method then includes driving the barrel portion of the female element through the pierced panel opening, preferably drawing a tubular panel portion from the plane of the panel, then deforming the barrel portion free end radially outwardly. Finally, the preferred method includes deforming the barrel portion free end toward the body portion into a U-shaped annular channel which opens toward the body portion and simultaneously driving the panel portion into the developing U-shaped barrel portion channel and deforming the panel portion in the channel to form a secure mechanical interlock between the panel and the female or fastener element.

In the method first disclosed in the above identified copending application, the female element annular barrel portion free end includes a piercing surface adjacent the opening to the annular barrel portion. The method includes piercing a slug from the panel with the barrel portion piercing surface. The panel slug is then disposed with the annular barrel portion to prevent collapse of the barrel portion as the panel is deformed against the exterior surface of the barrel portion and formation of the U-shaped channel portion at the free end of the barrel portion. The panel slug is then removed from the assembly by a punch received through the bore of the body portion.

The preferred method of installation first disclosed in this application includes piercing a slug from the panel with a punch disposed through the body portion bore, which removes the slug from the assembly prior to driving the free end of the female element barrel portion into the panel. This method simplifies the installation apparatus and provides other advantages, as described below. In either method, however, the female element may be attached to the panel in a continuous operation and the panel is pierced prior to driving the female element into the pierced panel opening and forming the preferred mechanical interlock described.

After the fastener element is located relative to the panel as described ready for installation, the barrel portion free end is preferably biased against the panel to preload the panel prior to piercing. This accurately locates the female element relative to the panel and assures concentricity of the final assembly, which is very important to the integrity of the mechanical interlock. Where the panel is pierced with a punch disposed through the female element body portion bore, the internal diameter of the bore is preferably less than the internal diameter of the barrel portion opening. The punch then pierces a slug from the panel having a diameter less than the internal diameter of the barrel portion, providing additional panel in the mechanical interlock. The method then includes driving the female element barrel portion free end against the panel adjacent the pierced opening, wherein the panel is preferably entrapped beneath the barrel portion free end, drawing the panel from the plane of the main panel portion. As described herein, the mechanical interlock between the panel portion adjacent the pierced panel opening and the female element is performed in a die member or die button. The preferred die button includes a smooth annular die cavity which deforms the free end of the barrel portion radially outwardly, preferably into the hook or U-shaped annular channel described and a central projecting portion which is telescopcially received within the female element barrel portion opening during the formation of the mechanical interlock. The central projecting portion also supports the panel portion adjacent the pierced panel edge during piercing and the panel portion is drawn over the central projecting portion of the die by the free end of the barrel portion, thinning the panel portion as the panel portion is driven into the annular die cavity.

In the most preferred method of this invention, the body portion of the female element has an external dimension which is greater than the external dimension of the barrel portion and the body portion includes an annular bottom wall or surface which faces the panel. The bottom wall of the body portion preferably includes a plurality of projecting ribs which provide anti-rotation means for the female element and improve the assembly as now described. The preferred method then includes driving the ribs into the panel portion adjacent the pierced panel edge, following receipt of the panel portion in the developing U-shaped channel at the free end of the barrel portion, and then driving the bottom wall of the body portion into the panel portion which has been received in the U-shaped barrel portion, increasing the mechanical interlock.

The preferred embodiment of the installation apparatus disclosed herein is particularly adapted for performing the newly disclosed method of installation, wherein the panel is pierced by disposing a punch through the bore in the female element body portion, prior to driving the female element into the panel, as described. The apparatus includes a base member which is adapted to be fixed relative to one die member of a die press having opposed relatively moveable die members. An annular plunger is reciprocably supported in the base member having a shank portion which extends through an opening in the base member. The apparatus also includes a nose member which is normally spaced from, but moveable toward the base member, having a plunger passage which telescopically receives the shank portion of the plunger. The nose member also includes a second passage which intersects and communicates with the plunger passage for receiving female elements for installation by the apparatus. The annular plunger has an axial guide passage extending therethrough which telescopically receives a piercing punch. The piercing punch has an axial length greater than the plunger and the piercing punch is fixed relative to the base member. In the disclosed embodiment, one end of the piercing punch is attached to the die member to which the base member is attached. The plunger is normally biased into the plunger passage of the nose member by a biasing or spring means, such that the free ends of the plunger and piercing punch are generally aligned adjacent the second passage in the nose member, such that a fastener element may be received in the plunger passage and aligned ready for installation opposite the plunger and punch members. The installation apparatus also includes an actuating means which relatively closes the base and nose members upon receipt of a female element aligned in the plunger passage ready for installation. In the disclosed embodiment of the installation apparatus, the base and nose members are relatively closed by closing the die press.

The disclosed embodiment of the installation apparatus performs the method of this invention, as follows. Relative closing movement of the nose and base members extends the plunger and piercing punch into the plunger passage of the nose member. The annular free end of the plunger first engages the opposed end of the fastener element body portion, biasing the barrel portion free end against a panel located opposite the plunger passage under the force of the biasing means. The piercing punch simultaneously extends into the bore of the female element body portion to engage the panel. The punch then pierces a slug from the panel, which is driven out of the assembly through the bore in the die button, as described above. Finally, the female element is driven into the panel by the plunger and installed in the pierced panel opening, as described above.

In the preferred embodiment of the installation apparatus, the base member includes a chamber and the plunger includes an enlarged head portion which is reciprocably supported in the base member chamber. The biasing means may then be located in the base member chamber, normally extending the plunger shank portion into the nose member plunger passage. In the preferred embodiment of the disclosed installation apparatus, the biasing means is pneumatic pressure. The apparatus includes a source of pneumatic pressure which maintains a predetermined pressure in the base member chamber. The pneumatic pressure escapes between the annular plunger and the piercing punch to the free ends of the plunger and punch members. This creates a vacuum adjacent the second passage in the nose member, drawing a female element from the second passage toward the plunger and centering the female element in the plunger passage, ready for installation. As will be understood, the female element must be accurately aligned in the plunger passage for receipt of the punch through the bore of the body portion. The vacuum created by the pneumatic biasing means assures the alignment required.

Other advantages and meritorious features of the method of attaching a female element to a panel and installation apparatus of this invention will be more fully understood from the following description of the preferred embodiments and the drawings, a brief description of which follows.

DESCRIPTION OF THE PREFERRED EMBODIMENTS

Figure 1:
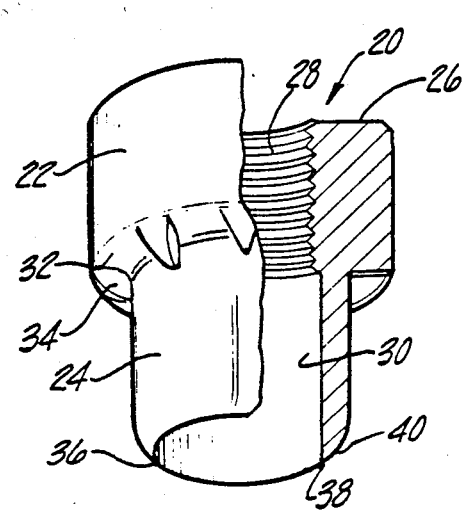
FIG. 1 is a partially cross-sectioned bottom elevation of one embodiment of a self-attaching female element or nut fastener which may be utilized in the method of attachment and installation apparatus of this invention.
Figure 2:
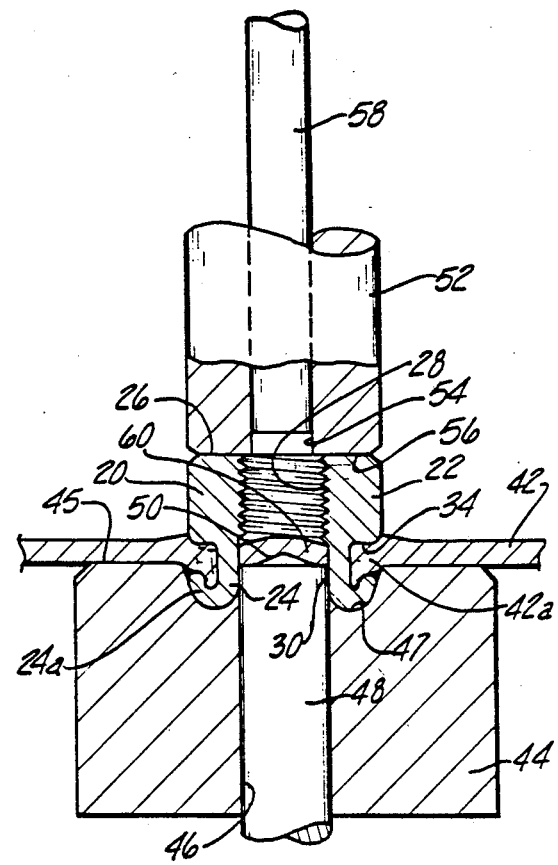
FIG. 2 is a partially cross-sectioned side view of one embodiment of the installation apparatus of this invention installing the nut fastener shown in FIG. 1 in a panel.
Figure 3:
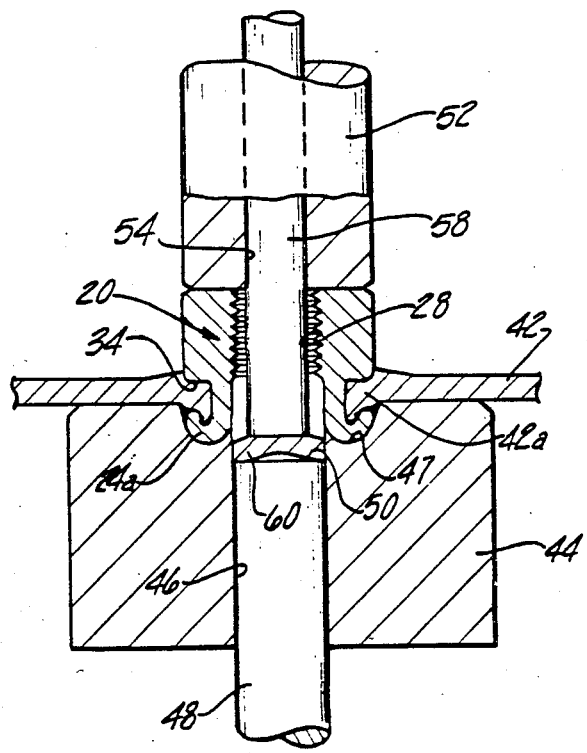
FIG. 3 is a partially cross-sectioned side view of the installation apparatus shown in FIG. 2 in the final step of the installation.

The following detailed description of the preferred embodiments references copending U.S. Pat. Application Ser. No. 563,833, filed December 21, 1983, the disclosure of which is incorporated herein by reference. FIGS. 1 to 3 of this application are taken from the above referenced copending application and disclose the then preferred embodiment of the self-piercing and riveting nut fastener, installation apparatus and method of installation. This application discloses an improved alternative method of attaching a modified self-riveting female element or nut fastener and a detailed description of the preferred embodiments of the installation apparatus and method of this invention. As used herein, female element is intended to be generic to elements having a threaded or unthreaded bore, which is preferably coaxially aligned with the opening in an integral annular barrel portion, including self-riveting nuts, rivets, bearing elements and the like. The disclosed embodiments are both nut fasteners for ease of description.

The self-piercing and riveting nut fastener 20 shown in FIG. 1 includes a body portion 22 and an annular barrel portion 24. The body portion 22 includes an annular driving surface 26 and a bore 28 through the driving surface and coaxially aligned with the opening 30 through the barrel portion. The body portion includes a bottom wall 32 adjacent the barrel portion 24 which includes a plurality of radially projecting ribs 34. The anti-rotation ribs 34 are generally triangular including a portion integral with the tubular barrel portion 24. The barrel portion 24 has a free end 36 which, in the disclosed embodiment, includes a relatively sharp piercing surface 38 at the opening 30 of the tubular barrel portion and an arcuate drawing surface 40.

As described more fully in the above referenced copending patent application, the self-piercing and riveting fastener 20 is adapted to pierce the panel and be permanently installed in the pierced panel opening. FIGS. 2 and 3 disclose the working components of one embodiment of an installation apparatus adapted to install the nut fastener shown in FIG. 1. The nut fastener 20 is first located adjacent a panel 42 with the free end 36 of the barrel portion 24 facing the panel. A die member or die button 44 is located on the opposite side of the panel from the nut fastener. As shown, the die button 44 includes an annular or semi-toroidal die cavity 47. A shoulder 45 surrounds the die cavity 47 which supports the main portion of the panel 42. The disclosed embodiment of the die button includes a bore 46 and a center die member 48 in fixed relation supported in the die button bore 46 during the installation of the nut fastener. As shown, the center die member 48 includes a conical end portion 50 which projects from the center of the annular die cavity 47.

The self-piercing and riveting nut 20 is centered in an installation apparatus opposite the die cavity 47 with the nut bore 28 coaxially aligned with the center die member 48. The installation apparatus includes a reciprocal annular plunger 52 having a center bore 54 and an annular end portion 56. In the disclosed embodiment, a ram or punch 58 is located in the bore 54 of the plunger. The annular end portion 56 of the plunger 52 drives the free end 36 of the nut fastener 20 into the panel 42. As described more fully in teh above referenced copending application, the piercing surface 38 pierces a slug 60 from the panel which is received and centered on the conical end portion 50 of the center die member 48. The free end 36 of the barrel portion 24 of the nut fastener is then received against the semi-toroidal surface of the annular die cavity 47 which deforms the free end 36 of the barrel portion 24 radially outwardly into a hook-shaped end portion or U-shaped annular channel 24a. The panel portion 42a adjacent the pierced panel opening is first deformed against the exterior surface of the annular barrel portion 24 as the barrel portion is received through the pierced panel opening. The panel portion 42a is then deformed into the developing U-shaped barrel portion 24a by the annular bottom wall 32 of the body portion 22 and finally, the ribs 34 are driven into the panel portion 42a as shown in FIG. 2. As the annular wall 24 is driven into the annular die cavity 47 the slug 60 is moved upwardly into the opening 30 in the annular barrel portion 24 such that the slug 60 supports the tubular barrel portion 24 at the point of greatest stress, preventing the annular barrel portion from collapsing inwardly during the riveting step. Thus, the slug 60 performs an important function in the method of installing the self-piercing and riveting nut fastener 20 shown in FIGS. 2 and 3. Further, the resultant nut and panel assembly forms an extremely rigid and secure mechanical interlock wherein the panel portion 42a is locked in the U-shaped channel 24a formed in the free end 36 of the nut fastener and the bottom wall 32 of the body portion 22. Further, the location of the projecting ribs 34 in the annular bottom wall 32 does not weaken the assembly, but serves to further deform the panel portion 42a, as shown.

Following installation, the slug 60 is driven out of the assembly by ram or punch 58 as shown in FIG. 3. As will be understood, the nut fastener is installed in the panel in a continuous operation after the nut is located in the installation apparatus opposite the panel, as described. Further, as described, the installation apparatus may be located in a die press, such as used by the automotive industry to form panels. In such an application, the head assembly including the reciprocal plunger 52 is attached to one die member or platen and the die button 44 is attached to the opposed die member. In a down-pierce installation, the installation head is attached to the upper die shoe and the die button is attached to the lower die shoe. It will be understood, however, that the assembly may be reversed in an up-pierce application. The terms upper and lower, top and bottom, are therefore relative terms and are used herein for descriptive purposes only.

Figure 4:
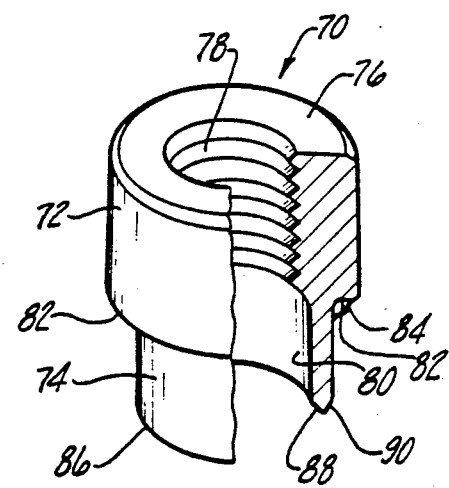
FIG. 4 is a partially cross-sectioned top elevation of a second embodiment of a nut fastener which may be utilized in the method of installation and installation apparatus of this invention.

FIG. 4 illustrates an improved self-riveting nut fastener 70 which is specifically adapted for installation by the type of apparatus disclosed in the following figures. As will be noted, the self-riveting nut 70 is of the same general configuration as the nut fastener 20 described above. The nut fastener includes a body portion 72 and an annular or tubular barrel portion 74. The body portion includes an annular driving surface 76 and a threaded bore 78 coaxially aligned and communicating with the opening 80 through the barrel portion. The bottom wall or annular surface 82 of the body portion includes a plurality of radial projecting ribs 84 and the free end 86 of the barrel portion 74 includes a chamgered surface 88 and an arcuate drawing surface 90.

As will be understood from the detailed description of the installation apparatus and method of installing the self-riveting nut fastener 70, the panel is pierced and the panel slug is driven out of the assembly by a punch received through the nut bore 78 prior to installing the nut in the pierced panel opening. Thus, the panel slug is not received in the opening 80 of the tubular barrel portion 74 to support the barrel portion during the riveting step. The barrel portion 74 has thus been modified by providing a chamfer 88 adjacent the opening 80 on the free end 86 of the barrel portion and the barrel portion has been shortened to avoid collapse during the riveting step. An arcuate surface may also be used in place of the chamfered surface 88.

Figure 5:
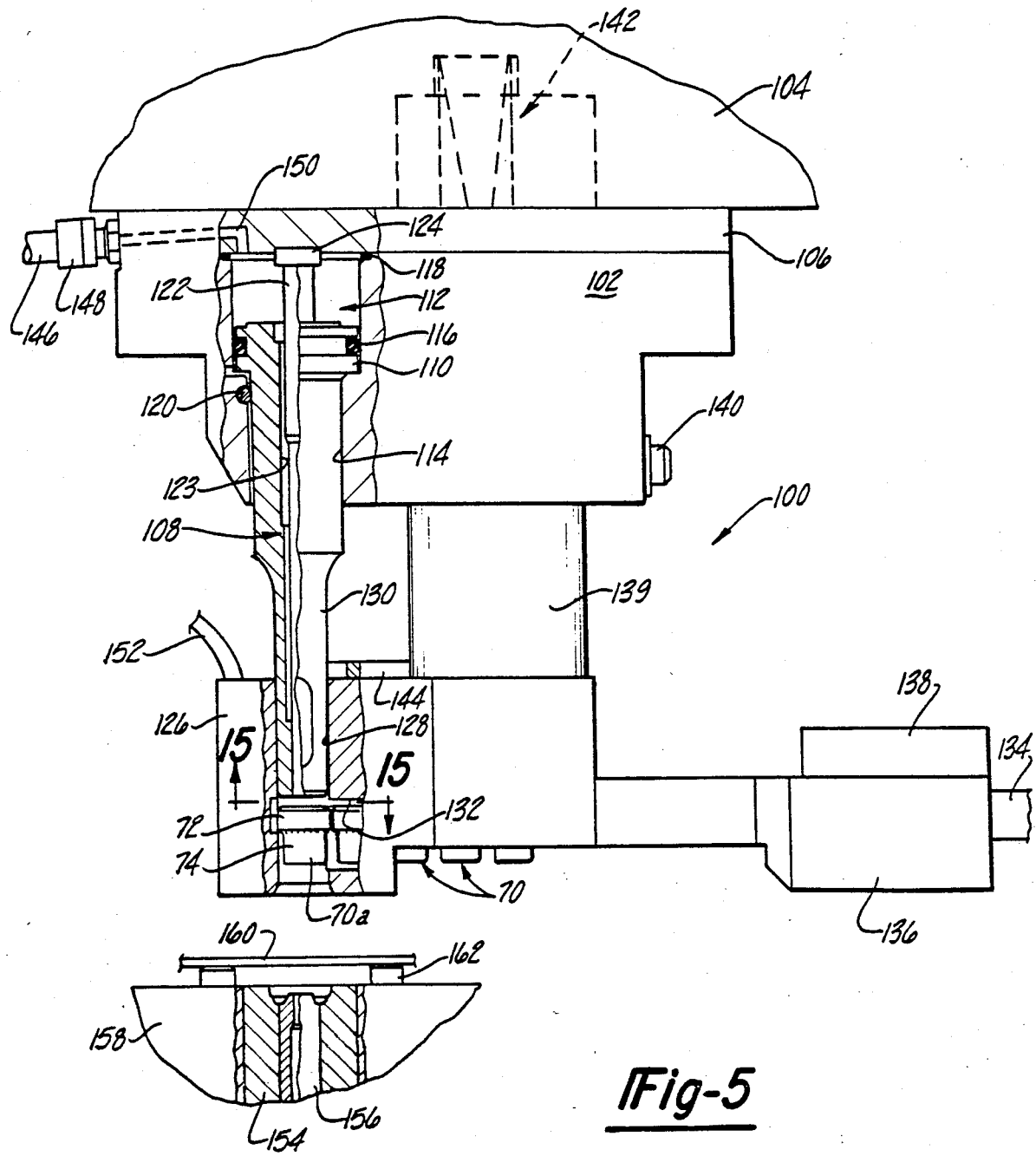
FIG. 5 is a partially cross-sectioned side view of a second embodiment of the installation apparatus of this invention ready to install a nut fastener as shown in FIG. 4.

The installation apparatus disclosed in FIG. 5 and the remaining figures is adapted to be secured within a die press having opposed moveable platens or die members. The female elements to be installed in the panel are received in a head assembly 100 having a base member 102 which may be attached to the upper die member or die shoe 104. As will be understood by those skilled in the art, the head assembly is normally attached to a backing plate 106 which includes the fastening means for attaching the head assembly to the upper die shoe. Normally, the head assembly 100 is attached to the backing plate 106 and the backing plate is attached to the upper die shoe 104 by bolts, screws or other conventional fastening means. As set forth above, however, the assembly may be reversed in an up-pierce application, wherein the head assembly 100 is attached to the lower die shoe.

The head assembly 100 includes an annular plunger 108 having an enlarged piston-like head portion 110 which reciprocates in a chamber 112 and the base member includes an opening 114 through which the plunger extends. In the disclosed embodiment, the plunger 108 is cylindrical and the chamber 112 and passage 114 are also cylindrical to support the reciprocal motion of the plunger. It will be understood, however, that the cross-sectional configuration of the plunger will depend upon the particular application. The disclosed embodiment of the self-riveting fastener 70 is also generally cylindrical, however, the shape of the nut fastener will also depend upon the particular application. For example, the body portion 72 of the nut fastener may be hexagonal or octagonal and the shape of the barrel portion 74 may also be modified provided, however, that the bore 78 of the female element body portion is preferably coaxially aligned with the opening 80 in the barrel portion.

The head portion 110 of the plunger is sealed within the chamber 112 by O-rings 116 and 118 on the plunger head portion 110 and at the end of the chamber, respectively. An orienting pin 120 is provided in the disclosed embodiment to prevent rotation of the plunger. The orienting pin includes a flat surface which slideably engages a flat surface on the plunger, preventing rotation of the plunger relative to the base member 102. A piercing punch 122 is disposed within the opening 123 which extends through the annular plunger. In the disclosed embodiment, the piercing punch includes a head 124 which is attached to the backing plate 106, opposite the head portion 110 of the plunger. The piercing punch 122 is therefore fixed relative to the base member 102 and the plunger 108 may move relative to the base member 102 and the piercing punch 122, within the chamber 112.

The head assembly 100 also includes a nose member 126 which moves relative to the base member 102 during installation of the female elements 70 as described hereinbelow. The nose member includes a plunger passage 128 which receives the shank portion 130 of the plunger 108 and the included piercing punch 122. The nose member also includes a transverse second passage 132 which communicates with the plunger passage for receipt of female elements, such as the nut fasteners 70. In the disclosed embodiment, the nut fasteners 70 are received through a plastic chute 134, which is attached to the nose member by a chute adapter 136. Access to the chute adapter is provided by a cover plate 138 which is attached to the chute adapter by screws or other fastening means. The nose member 126 is supported on the base member 102 by a guide cylinder 139 which guides the movement of the nose member relative to the base member. A stop pin 140 is provided which limits the space between the nose member and the base member and the nose member is normally spaced from the base member by a spring means, not shown. In the disclosed embodiment, a cavity 142 has been provided in the upper die shoe which receives the end of the guide cylinder 139 when the nose member moves toward the base member and a spacer block 144 is provided between the nose member 126 and the base member 102 to accurately limit the relative movement. As will be understood the general construction of the nose member 126 and base member 102, including the cylinder guide 139, stop pin 140 and the biasing spring assembly are known in the art and are utilized in pierce nut installation heads as disclosed in the patents assigned to the assignee of the instant application, including U.S. Pat. Nos. 3,098,576, 3,718,965 and 3,942,235, which are incorporated herein by reference.

A predetermined air pressure is maintained in the plunger chamber 112 by an air line 146, which is attached to the backing plate 106 by a fitting 148, and the backing plate includes an air passage 150 which provides communication between the air line 146 and the chamber 112. In a typical application, the line 146 is attached to the line pressure normally available in a manufacturing plant, which is generally between 40 and 70 PSI. The pneumatic pressure in the chamber 112 provides a biasing means which normally biases the plunger 108 into the plunger passage 128 of the nose member 126. In this position, the free ends of the plunger shank portion 130 and the piercing punch 122 are generally aligned adjacent the second passage 132 of the nose member, providing communication between the second passage 132 and the plunger passage 128, as shown in FIG. 5. The nut fastener is normally retained in the plunger passage, opposite the plunger and piercing punch, in the ready position 70a, by spring biased fingers, not shown, as described in the above referenced patents.

A panel 160 is located opposite the installation head on the lower die shoe 158. The installation die button 154 is located in the lower die shoe 158 coaxially aligned with the plunger passage 128, the plunger 108 and piercing punch 122. In the disclosed embodiment, the die button 154 includes a die button insert 156 which projects from the center of the die button, as disclosed more fully hereinbelow. Further, the panel is supported on conventional spring biased stripper pins 162 which assist in the stripping of the nut and panel assembly from the die button as will be understood by those skilled in the art. Further, in the disclosed embodiment, the actuating means for the installation apparatus includes a conventional magnetic proximity switch located in the nose member 126, nor shown, which indicates whether a nut fastener is located in the ready position 70a. The lead wire for the proximity switch is shown at 152. The conventional magnetic proximity switch is normally located opposite the second passage 132. When a nut fastener is located in the ready position, 70a, the proximity switch enables the actuation of the die press, wherein one of the die members or shoes is moved toward the other die shoe, installing a nut fastener in the panel. In a typical application, the upper die shoe 104 is moved toward the lower die shoe 158, as now described with the remaining figures.

Figure 6:
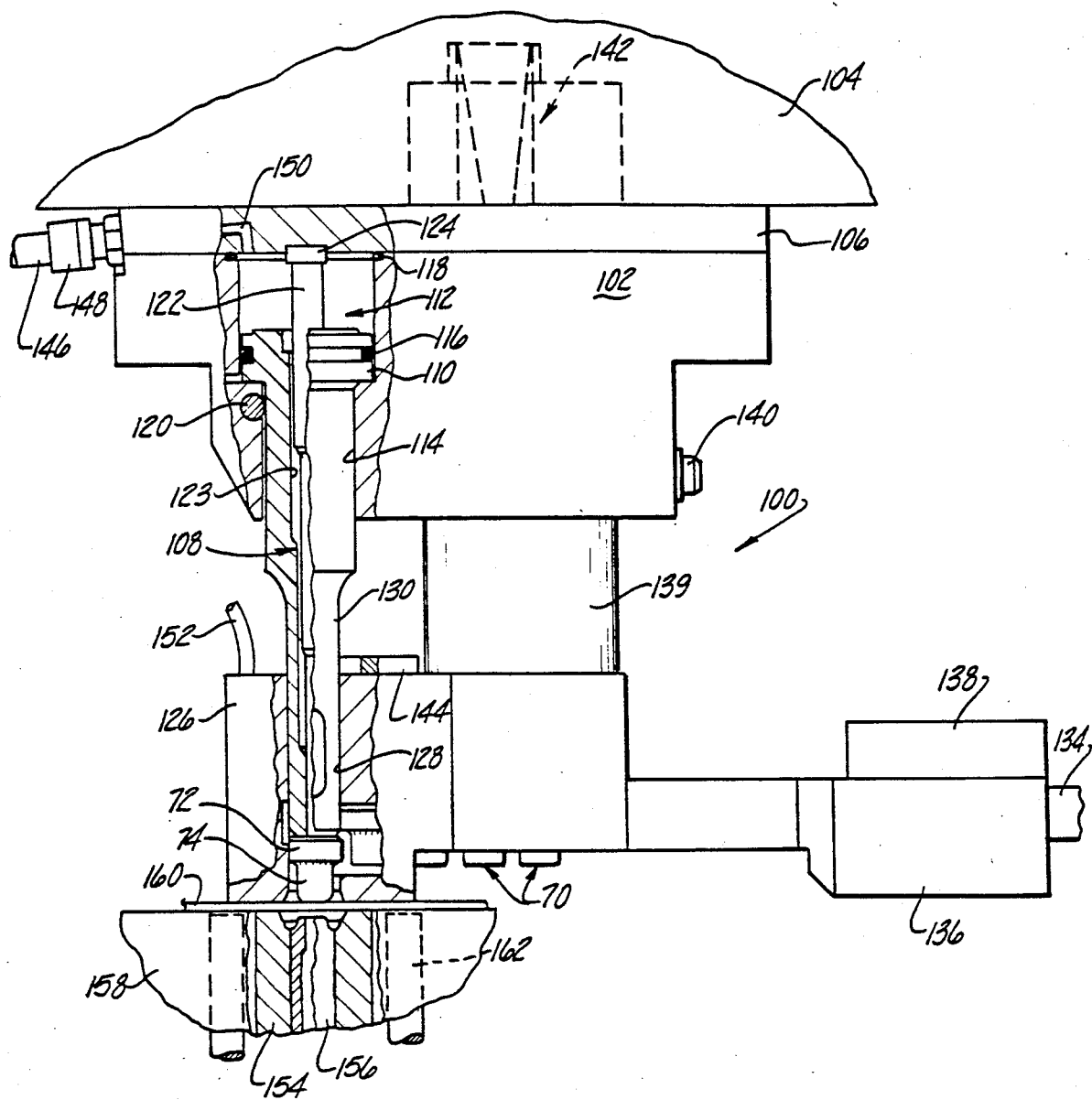
FIG. 6 is a partially cross-sectioned side view of the installation apparatus shown in FIG. 5 during an initial step in the method of installation of this invention.
Figure 7:
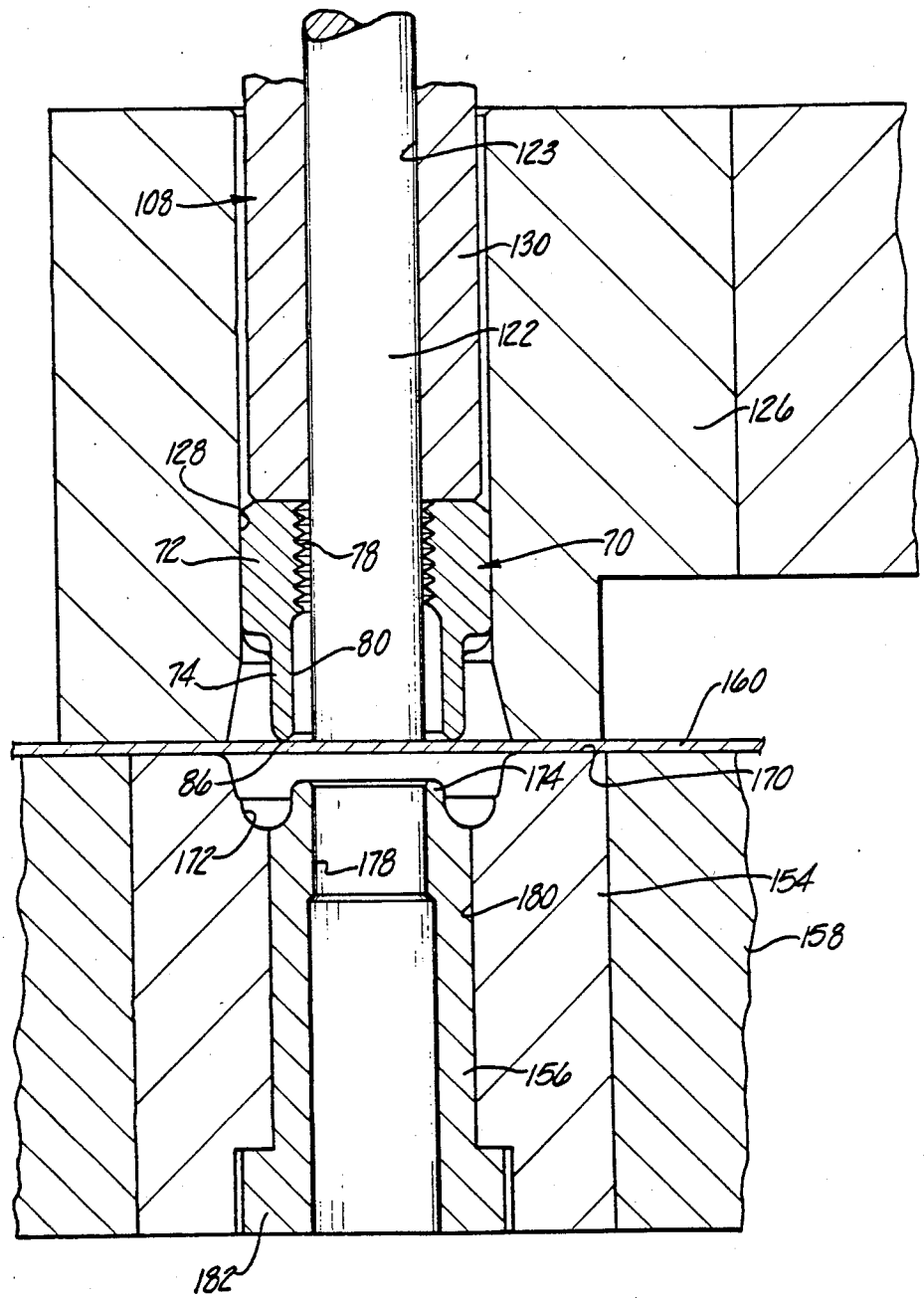
FIG. 7 is a partial enlarged side cross-sectional view of the installation apparatus as shown in FIG. 6.

Upon downward movement of the upper die shoe 104, the nose member 126 first engages the panel 160, biasing the stripper pins 162 toward the die button 154 and reducing the space between the nose member 126 and the base member 102 as shown in FIG. 6. This relative movement extends the plunger shank portion 130 into the plunger passage 128 to engage the annular driving surface 76 of the body portion 72 of the nut fastener, moving the nut fastener from the ready position to the panel, as best shown in FIG. 7. In this position, the panel 160 is firmly clamped between the nose member 126 and the shoulder 170 of the die button 154 or the panel is clamped to the lower die shoe. The free end 86 of the nut barrel portion 74 is biased against the panel by the shank portion 130 of the plunger member 108, preloading the panel. As described above, the plunger is resiliently biased into the plunger passage by the pneumatic pressure in the base member chamber 112. As shown in FIG. 6, the plunger head portion 110 has not yet moved in the chamber 112, however the pressure of the free end 86 of the nut fastener against the panel is sufficient to slightly indent or mark the panel, which is important to accurately coaxially align the nut barrel portion 74 with the annular die cavity 172 in the die button 154 and maintain the concentricity of the nut and panel assembly during the installation of the nut fastener.

As best shown in FIG. 7, the die button 154 includes a semi-toroidal die cavity 172 and the die button insert 156 includes a projecting end portion 174 which smoothly continues the annular concave surface of the die cavity. A stepped bore 178 extends through the die button insert, which is coaxially aligned with the piercing punch 122. In the disclosed embodiment, the die button insert 156 is press fitted into the bore 180 in the die button 154 and the die insert includes an enlarged end portion 182 which accurately locates the insert in the die button. As will be understood by those skilled in the art from the following description of the method of installation, the projecting end 174 of the die button insert is subject to wear and therefore a separate replaceable insert has been used. It will be understood, however, that the die button may be an integral unit as disclosed in the above referenced copending application.

Figure 8:
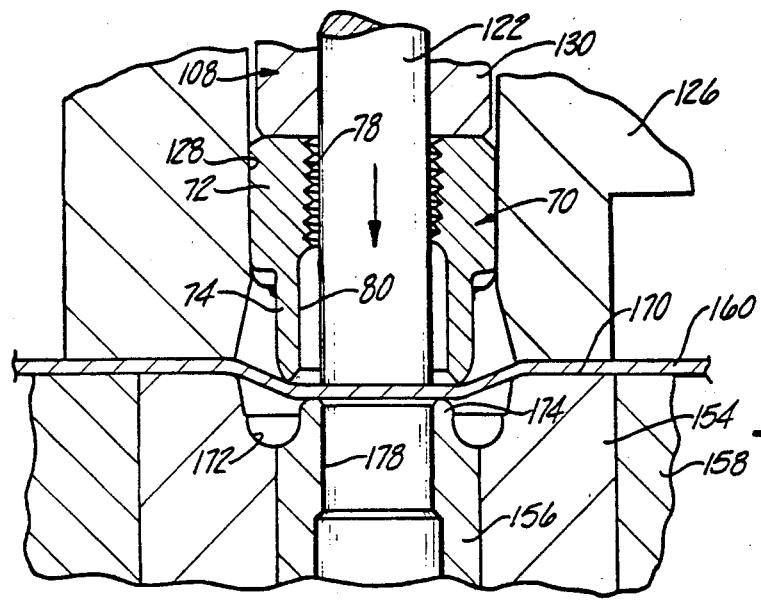
FIG. 8 is a partial enlarged side cross-sectional view of the installation apparatus shown in FIGS. 5–7 illustrating a further step of the method of installation of this invention.

In the relative positions of the base and nose members 102 and 126 shown in FIG. 6, the piercing punch 122 is extended through the nut bore 78 of the body portion 72 and the opening 80 through the barrel portion 74 to engage the panel as shown in FIG. 7. As set forth above, the free end 86 of the barrel portion 74 is biased against the panel by the plunger shank portion 130, preloading the panel and maintaining the coaxial alignment of the tubular barrel portion 74 with the annular die cavity 172. Continued closing of the die press moves the nose member 126 toward the base member 102 because the nose member is bottomed on the lower die shoe 158, as shown in FIG. 6. The piercing punch 122 therefore moves relative to the plunger 108, through the opening 123 in the plunger, biasing the panel into the annular die cavity 172 in the die button and against the projecting end portion 174 of the die button insert 156, as shown in FIG. 8. As will be noted, the free end 86 of the nut fastener barrel portion 74 maintains the preload condition against the panel, as described above. The panel 160 remains clamped between the shoulder 170 of the die button 154 and the nose member 126.

Figure 10:
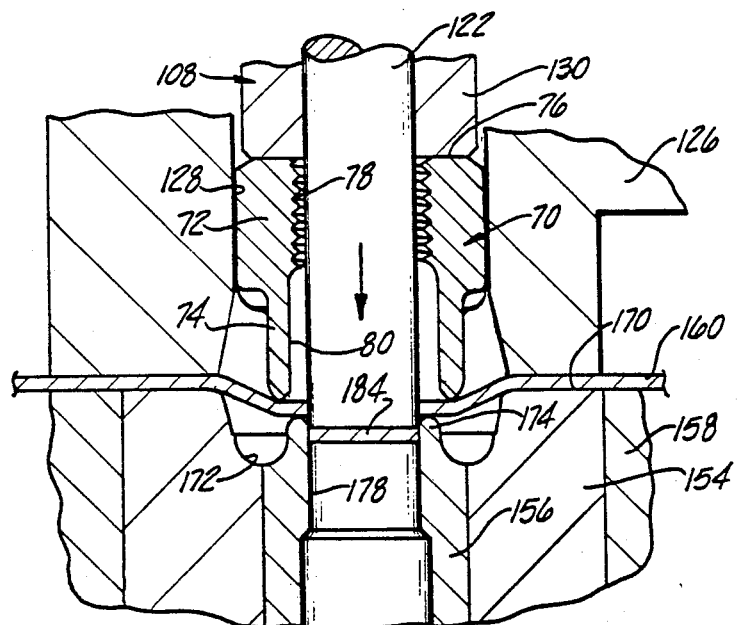
FIG. 10 is a partial enlarged side cross-sectional view of the installation apparatus as shown in FIG. 9.
Figure 9:
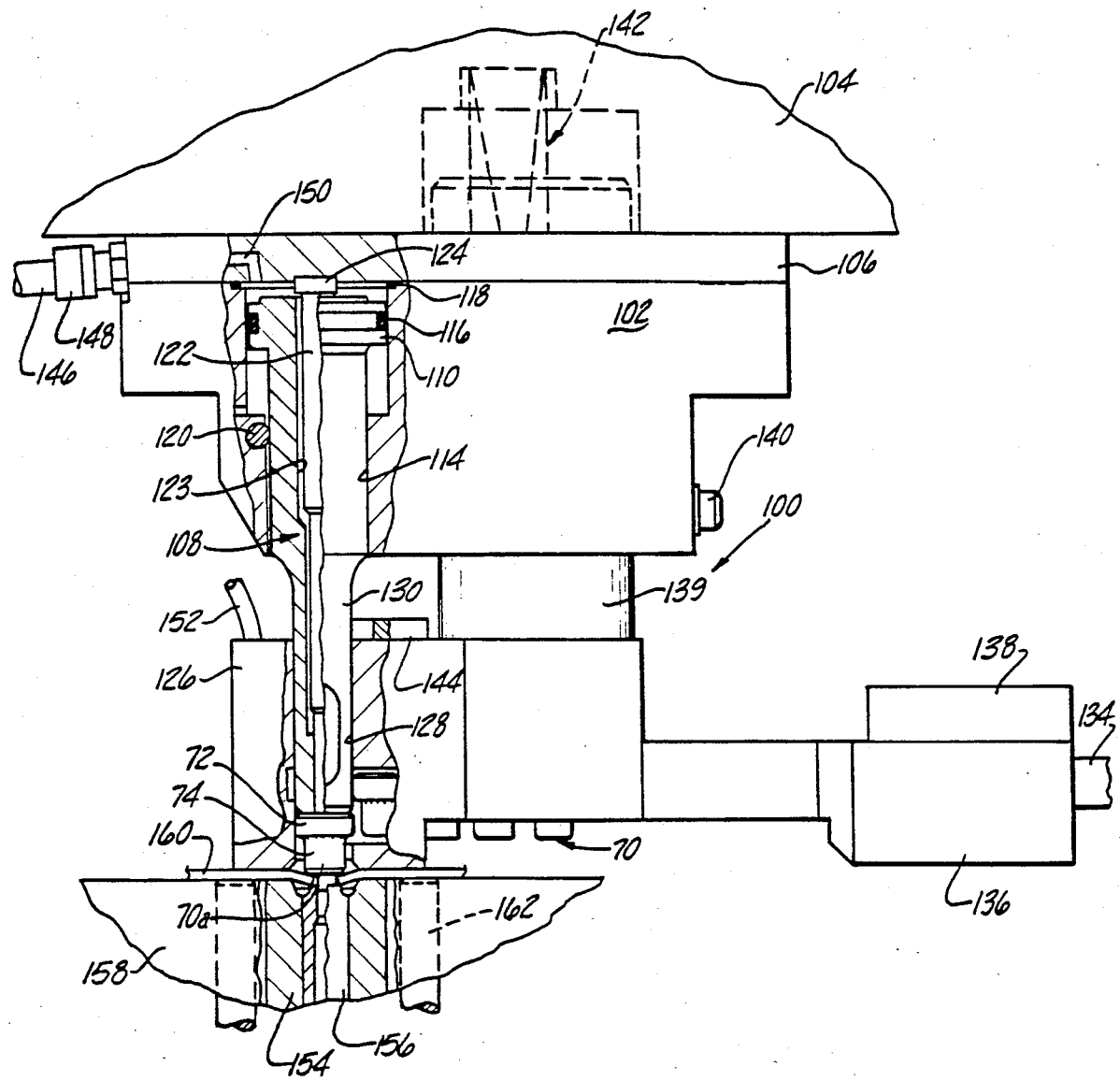
FIG. 9 is a partially cross-sectioned side view of the installation apparatus shown in FIGS. 5 and 6 illustrating a further step of the method of installation of this invention.

Continued relative closing of the die press causes the piercing punch 122 to extend through the panel and pierce a slug 184 from the panel as best shown in FIG. 10. In this position, as shown in FIG. 9, the head portion 110 of the plunger head portion 110 remains slightly spaced from the backing plate 106, such that the plunger is not yet fixed relative to the base member 102, however, the free end 86 of the barrel portion 74 remains preloaded against the panel under the pneumatic pressure in the plunger chamber 112. The panel is pierced between the chamfered opening to the bore 178 in the die button insert 156 and the outer edge of the piercing punch 122 and the panel slug 184 is immediately removed from the assembly into the bore 178 of the die button insert.

Figure 11:
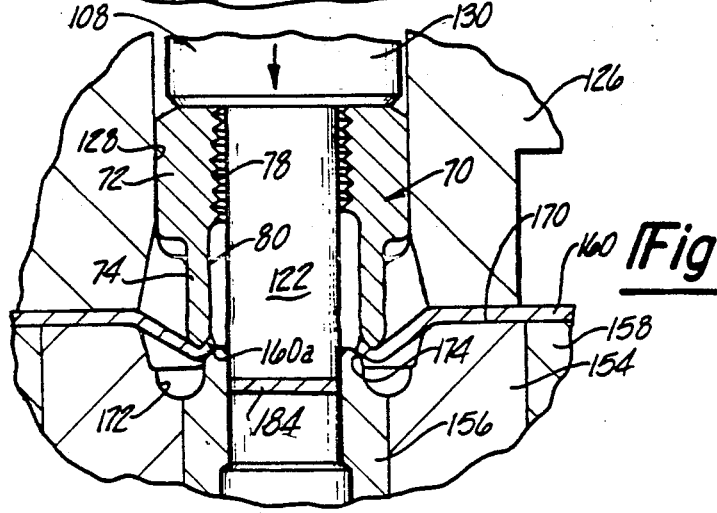
FIG. 11 is a partial enlarged side cross-sectional view of the installation apparatus shown in FIGS. 5–10 illustrating a further step in the method of installation of this apparatus.
Figure 12:
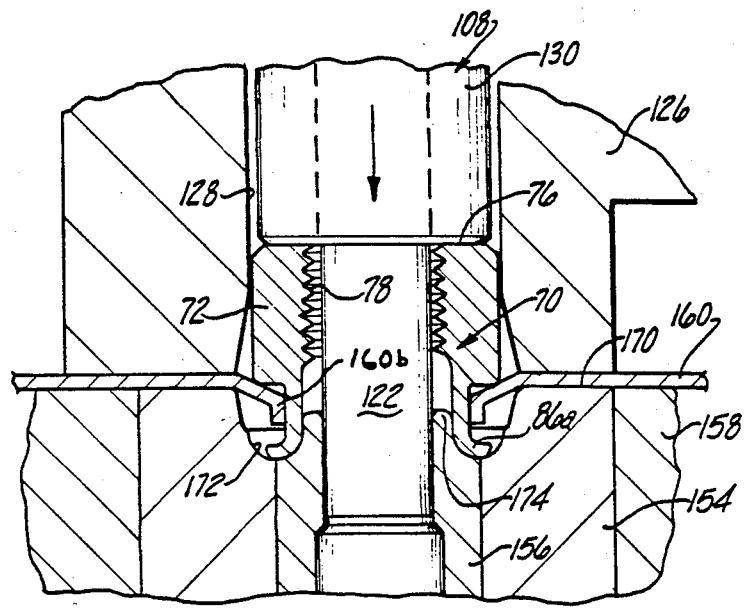
FIG. 12 is a partial enlarged side cross-sectional view of the installation apparatus shown in FIGS. 5–11 illustrating a further step in the method of installation of this invention.
Figure 13:
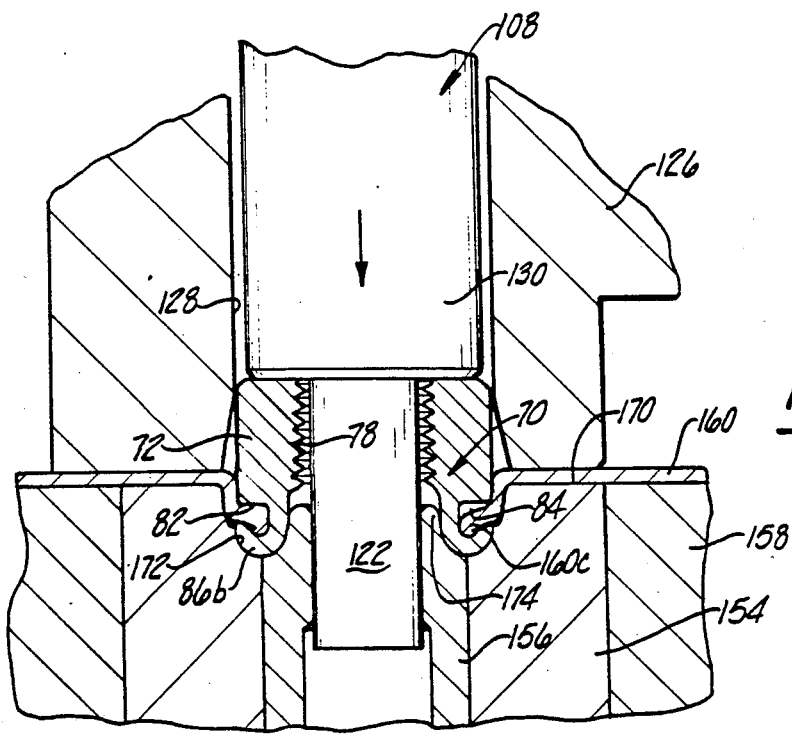
FIG. 13 is a partial enlarged side cross-sectional view similar to FIG. 12 illustrating the final step of the method of installation of this invention.
Figure 14:
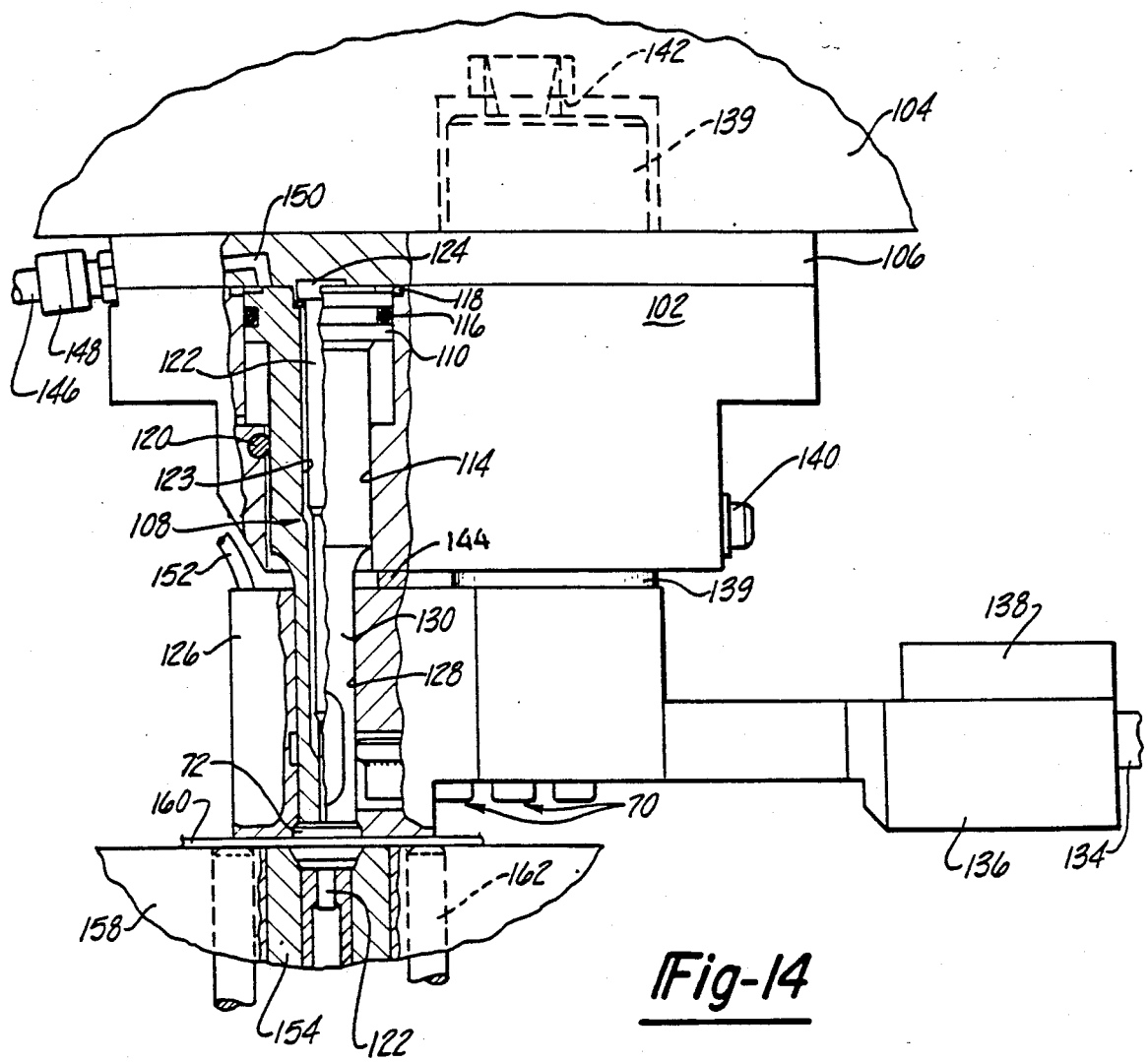
FIG. 14 is a partial side cross-sectional view of the installation apparatus shown in FIGS. 5, 6 and 9 illustrating the position of the installation apparatus following installation of a nut fastener.

When the plunger head 110 bottoms against the backing plate 106, the shank portion 130 of the plunger drives the free end 86 of the barrel portion 74 into the panel portion 160a adjacent the pierced panel opening as shown in FIG. 11. The panel portion 160a is initially entrapped beneath the free end 86 of the barrel portion and the convex surface of the projecting end portion 174 of the die button insert, slightly thinning the panel portion and drawing the panel portion into the annular die cavity 172. As the plunger continues to drive the nut fastener into the die cavity 172, the free end 86 of the barrel portion 74 engages the bottom semi-toroidal surface of the die cavity 172, deforming the barrel portion free end radially outwardly as shown in FIG. 12 at 86a. The panel portion adjacent the pierced panel opening is simultaneously drawn against the exterior surface of the barrel portion 74 into a tubular configuration 160b, as shown in FIG. 12. Finally, the free end of the annular barrel portion is turned toward the body portion 72 of the nut fastener against the surface of the die cavity 172 into a U-shaped channel 86b, which is hook-shaped in cross section as shown in FIG. 13. The annular surface of the female element bottom wall 82 is simultaneously driven into the panel, deforming the panel portion in the developing U-shaped channel 86b and enlarging the end of the panel portion, as shown at 160c in FIG. 13. Further, the projecting ribs 84 on the bottom wall 82 of the body portion are driven into the panel portion 160c, providing antirotation means for the nut fastener in the panel and further deforming the panel portion in the hook-shaped end portion 86b of the barrel portion. The nose member 126 is now fully seated against the base member 102 as shown in FIG. 14. That is, the base member 102 has bottomed against the spacer block 144, limiting the relative movement between the nose member 126 and the base member 102. Further, the guide cylinder 139 has moved into the cavity 142 in the upper die shoe 104.

The assembly between the female element 70 and the panel 160 is now complete. Upon opening of the die press, the base member 102 is first lifted with the upper die shoe 104 until the nose member 126 is fully spaced from the base member as shown in FIG. 5. As described above, the base and nose members are normally spaced by a spring or other biasing means. In the disclosed embodiment, a spiral spring is located in the guide cylinder 139 biased against the upper die shoe 104. The nose member 126 is then lifted off of the assembly and the stripper pins 162 lift the panel from the shoulder 170 of the die button. The feed mechanism, not shown, then feeds a fastener element from the second passage 132 in the nose member 126 to the plunger passage 128 to the ready position 70a shown in FIG. 5. Various feed and chuck systems are disclosed in the above referenced patents. A gravity feed may also be utilized, particularly in the disclosed installation apparatus which includes a vacuum assist, as now described.

Figure 15:
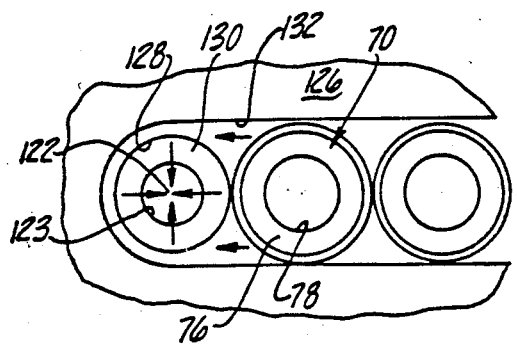
FIG. 15 is a partially schematic cross-sectional view of FIG. 5 in the direction of view arrows 15—15.

As shown in FIG. 5 and 15, a vacuum is created adjacent the second nut passage 132 which draws a female element 70 adjacent the plunger passage into the plunger passage 128 and centers the female element relative to the piercing punch 122 and plunger 108. The pneumatic pressure in the chamber 112 supplied by air line 146 escapes between the piercing punch 122 and the plunger 108 through the opening 123 through the plunger. Because the space between the piercing punch 122 and the plunger 108 is substantially less than the volume of the chamber 112, the velocity of the air increases. When a female element is not located in the plunger passage 128, the air escapes through the plunger passage 128, creating a vacuum adjacent the second passage 132. This reduced pressure tends to draw a fastener 70 from the second passage into the plunger passage as shown in FIG. 15, which is a compound cross-sectional view used to illustrate the pressure differential acting on a nut in the second passage. In actual operation, a small nut fastener 70 will be drawn into the plunger passage 128 by the vacuum described. More importantly, the vacuum serves to center a nut fastener of the type disclosed beneath the plunger and piercing punch, assuring orientation of a female element in the plunger passage, ready for installation. This feature of the installation apparatus of this invention is particularly useful in a gravity feed system.

Having described the preferred embodiments of the female element and the installation apparatus, it is now possible to summarize the preferred methods of installation. As described above, the preferred method of installation includes first locating a female element adjacent a panel with the free end of the barrel portion facing the panel. In the method of attachment shown in FIGS. 1 to 3, the free end 36 of the barrel portion 24 includes a piercing surface 38 which pierces a slug 60 from the panel, forming a pierced panel opening which is coaxially aligned with the body portion bore 28 and the opening 30 through the barrel portion. With the embodiment of the female element 70 shown in FIG. 4, the panel is pierced by a piercing punch 122 which is disposed through the body portion bore 78 and the opening 80 through the barrel portion 74. Next, the female element barrel portion is driven through the pierced panel opening. In FIGS. 1 to 3, the plunger 52 drives the free end 36 of the barrel portion 24 into the panel to first pierce the panel 42 and then the free end 36 of the barrel portion is driven through the pierced panel opening to deform the barrel portion free end radially outwardly. The panel portion 42a is simultaneously deformed against the exterior surface of the barrel portion 24 into a tubular configuration, drawing the panel portion from the plane of the panel 42.

In the installation method disclosed in FIGS. 5 to 14, the plunger shank portion 130 first biases the free end 86 of the barrel portion 74 against the panel 160, preloading the panel as shown in FIG. 7. The center punch 122 then deforms the panel into the die cavity 172 to engage the projecting end 174 of the die insert 156 while the panel remains preloaded by the free end 86 of the barrel portion, as shown in FIG. 8. The panel is then pierced by the center punch 122 and the panel slug 184 is removed from the assembly, prior to driving the free end 86 of the barrel portion into the panel, as shown in FIG. 10. The free end 86 of the barrel portion is then driven into the panel, entrapping the panel portion 160a beneath the free end of the barrel portion and slightly thinning the panel portion, as shown in FIG. 11. The free end of the barrel portion is then driven through the pierced panel opening and against the concave annular wall of the die cavity 172, deforming the free end of the barrel portion radially outwardly as shown at 86a in FIG. 12. As noted above, the panel portion adjacent the pierced panel opening is simultaneously drawn into a tubular configuration 160b against the exterior surface of the barrel portion 74.

Finally, in the most preferred method of this invention, the free end of the barrel portion is deformed into a U-shaped annular channel which opens toward the body portion and the panel portion adjacent the pierced panel opening is simultaneously deformed in the developing U-shaped barrel portion to form a secure mechanical interlock between the panel and the female element. As described above in regard to FIGS. 1 to 3, the free end of the barrel portion 24 of the female element is deformed against the concave annular wall of the die cavity 47 into a U-shaped channel 24a and the panel portion 42a is deformed within the hook-shaped portion, forming a secure mechanical interlock. Following formation of the nut and panel assembly, the slug 60 is driven out of the assembly, as shown in FIG. 3. In the method of installation shown in FIG. 13, the free end 86b of the barrel portion is similarly deformed into a U-shaped channel portion and the panel portion 160c is deformed within the barrel portion channel, securely retaining the panel portion, as described above.

Having described the preferred embodiments of the method of attaching a female element to a panel and the preferred embodiments of the installation apparatus of this invention, it will be understood that various modifications may be made to the method and the installation apparatus within the purview of the appended claims. The configuration and dimensions of the self-riveting female fastener, for example, will depend upon the particular application and the panel thickness. As described above, the disclosed female elements and methods of attachment of this invention are particularly adapted for permanent attachment of the female element to relatively thin panels, such as utilized for structural components in the automotive and appliance industries. For example, the female element may be attached to relatively thin panels having a thickness of approximately 0.025 inches to relatively thick panels for the automotive industry having a thickness of 0.125 inches. The dimensions of the female element will, of course, depend upon the thickness of the panel and the particular application. A female element, such as a self-riveting nut, may be formed of medium carbon steels. Further, the configuration of the body portion of the female element will depend upon the preferred application. Thus, the body portion may be of any suitable configuration and the barrel portion may be cylindrical, hexagonal, etc. The female elements may be formed by conventional hot or cold forming methods.

I now claim:

1. A self-attaching female fastener for attachment to a panel, said female fastener comprising: an elongated generally cylindrical body portion having an axial bore therethrough, a tubular barrel portion extending coaxially from and integral with said cylindrical body portion having an internal surface of substantially constant diameter coaxially aligned with said body portion bore and communicating therewith, said barrel portion having a free end spaced from said body portion including an annular arcuate outer driving surface extending from the external surface of said tubular barrel portion to said free end for driving against said panel and a conical internal surface extending inwardly from said arcuate driving surface, said conical internal surface intersecting said arcuate driving surface at said barrel portion free end defining a circular edge at said free end for engaging said panel, and said barrel portion having an external diameter less than the external diameter of said body portion forming a radial shoulder adjacent said barrel portion for driving into said panel during installation of said fastener, recessing said fastener in said panel.

2. The self-attaching female fastener defined in claim 1, characterized in that said elongated generally cylindrical barrel portion has an axial length approximately equal to the axial length of said tubular barrel portion.

3. The self-attaching female fastener defined in claim 1, characterized in that said body portion bore is internally threaded and having a thread diameter less than the internal diameter of said barrel portion internal surface.

4. The self-attaching female fastener defined in claim 3, characterized in that said internal surface of said barrel portion blends into said threaded bore through an arcuate surface.

5. A self-attaching fastener element for attachment to a panel supported on a female die member, said self-attaching female element including a body portion and an integral tubular barrel portion including generally cylindrical internal and external surfaces and a free end spaced from said body portion, said barrel portion free end including an annular arcuate outer drawing surface extending from adjacent said barrel portion external surface to said free end and a generally conical inner surface flaring outwardly from adjacent said barrel portion internal surface, said generally conical inner surface intersecting said arcuate outer drawing surface adjacent said free end defining a circular edge at said barrel portion free end for engaging said panel.

6. The self-attaching female element defined in claim 5, characterized in that said barrel portion includes a threaded bore coaxially aligned with said barrel portion internal surface and said barrel portion internal surface having a constant internal diameter throughout its length.

* * * * *

UNITED STATES PATENT AND TRADEMARK OFFICE
CERTIFICATE OF CORRECTION

PATENT NO. : 4,911,592
DATED : March 27, 1990
INVENTOR(S) : Rudolph R. M. Muller It is certified that error appears in the above-identified patent and that said Letters Patent is hereby corrected as shown below:

<u>Column 14,</u>
Line 36, cancel "female" that appears between "attaching" and "element" to include -- fastener --.
Line 48, cancel "female" that appears between "The self-attaching" and "element" to include -- fastener --.

Signed and Sealed this

Twenty-third Day of August, 2005

JON W. DUDAS
*Director of the United States Patent and Trademark Office*